(12) United States Patent
Imashiro et al.

(10) Patent No.: US 6,194,500 B1
(45) Date of Patent: Feb. 27, 2001

(54) MODIFIED EMULSION OF POLYCARBONATE RESIN AND PROCESS FOR PRODUCTION THEREOF

(75) Inventors: Yasuo Imashiro; Ikuo Takahashi, both of Tokyo; Takao Masaki; Akito Iwao, both of Osaka, all of (JP)

(73) Assignees: Nisshinbo Industries, Inc., Tokyo; Matsumoto Yushi-Seiyaku Co., Ltd., Osaka, both of (JP)

(*) Notice: Subject to any disclaimer, the term of this patent is extended or adjusted under 35 U.S.C. 154(b) by 0 days.

(21) Appl. No.: 09/323,961

(22) Filed: Jun. 2, 1999

(30) Foreign Application Priority Data

Jun. 3, 1998 (JP) .................................. 10-154417

(51) Int. Cl.$^7$ ..................................... C08K 5/29
(52) U.S. Cl. ......................... 524/195; 524/375; 524/376; 524/377; 524/378; 524/611; 525/467
(58) Field of Search ..................................... 524/195, 375, 524/376, 377, 378, 611; 525/467

(56) References Cited

U.S. PATENT DOCUMENTS 5,621,031 * 4/1997 Leimann .

\* cited by examiner

*Primary Examiner*—David J. Buttner
(74) *Attorney, Agent, or Firm*—Kubovcik & Kubovcik

(57) ABSTRACT

A modified emulsion of polycarbonate resin, comprising a polycarbonate resin emulsion and a monocarbodiimide compound and/or a polycarbodiimide compound; and a process for producing a modified emulsion of polycarbonate resin, which comprises adding a monocarbodiimide compound and/or a polycarbodiimide compound to a polycarbonate resin emulsion.

This modified emulsion of polycarbonate resin is improved in adhesivity, water resistance and chemical resistance.

5 Claims, No Drawings

MODIFIED EMULSION OF POLYCARBONATE RESIN AND PROCESS FOR PRODUCTION THEREOF

BACKGROUND OF THE INVENTION

1. Field of the Invention

The present invention relates to a modified emulsion of polycarbonate resin and a process for production of said emulsion. More particularly, the present invention relates to a polycarbonate emulsion improved in adhesivity, water resistance and chemical resistance, as well as to a process for producing such a polycarbonate resin emulsion.

2. Description of the Prior Art

Polycarbonate resins, which are a thermoplastic resin, are superior in heat resistance, impact resistance, transparency and dimensional stability. Therefore, they are in wide industrial use as molded products such as electric or electronic parts and the like. Moreover, they have come to be used recently also as surface coatings for various base materials, owing to their properties.

These coatings have heretofore been used mainly as a solvent-based coating obtained by dissolving a polycarbonate resin in an organic solvent such as toluene, xylene, acetone, ethyl acetate, butyl acetate, cyclohexanone, methylene chloride, chloroform, dimethyl formamide, tetrahydrofuran, dioxane, dioxolan or the like. In recent years, however, a demand for a water-based coating (using no solvent) has increased in consideration of air pollution, fire hazard and environmental sanitation during application, associated with the solvent-based coating.

With respect to the demand for such a water-based coating containing a polycarbonate resin, there was proposed a process for producing the coating by emulsifying a polycarbonate resin in water using a small amount of an emulsifier. The water-based coating produced by such a process is free from the above-mentioned problems of solvent-based coatings containing a polycarbonate resin.

Water-based coatings containing a polycarbonate resin, however, have the following problems. That is, a polycarbonate resin itself has low adhesivity to a base material; when the polycarbonate resin is made into an aqueous emulsion using an emulsifier, the emulsifier has an adverse effect and, as a result, the polycarbonate resin comes to have even lower adhesivity.

Further, when a water-based coating of polycarbonate resin is applied to form a coating film, an emulsifier remains in the dried coating film and, as a result, the film has reduced water resistance and reduced chemical resistance (these problems can not be ignored).

SUMMARY OF THE INVENTION

The present invention has been completed in view of the above situation. The present invention has an object of providing (1) a modified emulsion of polycarbonate resin, which is improved in adhesivity, water resistance and chemical resistance and (2) a process for producing such a modified emulsion of polycarbonate resin.

According to the present invention there is provided a modified emulsion of polycarbonate resin, comprising a polycarbonate resin emulsion and a monocarbodiimide compound and/or a polycarbodiimide compound.

According to the present invention, there is also provided a process for producing a modified emulsion of polycarbonate resin, which comprises adding a monocarbodiimide compound and/or a polycarbodiimide compound to a polycarbonate resin emulsion.

DETAILED DESCRIPTION OF THE INVENTION

The present invention is hereinafter described in detail.

The polycarbonate resin emulsion used in the present invention can be exemplified by an emulsion containing a polycarbonate resin and an adduct of (a) a polyhydric alcohol or an aromatic alcohol and (b) an alkylene oxide.

The polycarbonate resin used in the present invention can be exemplified by an ordinary-grade product having a molecular weight of 10,000 to 100,000 produced by using bisphenol A as a main raw material. Since a high molecular weight may make emulsification difficult, a polycarbonate resin having a molecular weight of 10,000 to 50,000 is preferred.

The polyhydric alcohol used for obtaining an adduct of a polyhydric alcohol and an alkylene oxide, used in the present invention can be exemplified by dihydric alcohols such as 1,4-butanediol, 1,6-hexanediol, neopentyl glycol and the like; and trihydric or higher alcohols such as trimethylolpropane, glycerine, pentaerythritol, castor oil, sorbitan and the like. A trihydric or higher alcohol is preferred.

The reason why a trihydric or higher alcohol is preferred, is presumed to be as follows. Since the polycarbonate resin used in the present invention has a high molecular weight, an emulsifier having a certain high molecular weight is necessary in order to emulsify the polycarbonate in water. In an adduct of a polyhydric alcohol, particularly a trihydric or higher alcohol and an alkylene oxide, the hydrophobic group has a relatively large molecular weight and the hydrophilic group is branched; therefore, even when the moles of alkylene oxide added are relatively large and the resulting adduct has a high molecular weight, the adduct has a balance between the hydrophobic group and the hydrophilic group and can satisfactorily emulsify the polycarbonate.

In contrast, merely when the moles of alkylene oxide added are large and the resulting adduct has a straight chain of high molecular weight, the adduct has a large hydrophilic group, is not balanced between the hydrophobic group and the hydrophilic group, and has no sufficient emulsification power.

The aromatic alcohol used for producing an adduct of an aromatic alcohol and alkylene oxide used in the present invention can be exemplified by monocyclic phenols (having one aromatic ring) such as phenol, phenol having at least one alkyl group, and the like; polycyclic phenols (having at least two aromatic rings) such as phenylphenol, cumylphenol, benzylphenol, bisphenol, naphthol and the like; and reaction products between monocyclic or polycyclic phenol and styrene, i.e. stryrenated phenols.

The alkylene oxide added to the polyhydric alcohol or the aromatic alcohol can be exemplified by alkylene oxides having 2 to 4 carbon atoms, for example, ethylene oxide (EO), propylene oxide (PO) and butylene oxide (BO). These alkylene oxides can be used in combination of two or more kinds. The addition form may be random or block. Ethylene oxide (EO) is particularly preferred and the moles of EO added are generally 5 to 250, preferably 30 to 200.

There is no particular restriction as to the method for adding the alkylene oxide to the polyhydric alcohol or the aromatic alcohol, and an appropriate known method can be used. The obtained adduct between (a) the polyhydric alcohol and/or the aromatic alcohol and (b) the alkylene oxide can be used singly or in combination of two or more kinds.

The polycarbonate resin emulsion used in the present invention can further contain, as necessary, a polyalkylene ether glycol having oxyalkylene units.

The polyalkylene ether glycol having oxyalkylene units can be exemplified by polyethylene glycol, polypropylene glycol and polybutylene glycol. The oxyalkylene units may be a combination of two or more kinds and may be random or block. Preferred is an ethylene oxide (Eo)-propylene oxide (PO) block polyalkylene ether glycol having a molecular weight of 5,000 to 20,000.

The polycarbonate resin emulsion used in the present invention can be, for example, one obtained by dissolving, in an organic solvent, a mixture of a polycarbonate resin, an adduct of (a) a polyhydric alcohol and/or an aromatic alcohol and (b) an alkylene oxide and, as necessary, a polyalkylene ether glycol having oxyalkylene units, then mixing the resulting solution with water to give rise to emulsification, and subjecting the resulting emulsion to solvent removal.

Specifically, first there is dissolved, in at least one kind of organic solvent selected from dimethylformamide, dioxane, dioxolan, toluene, chloroform, methylene chloride, etc., a polycarbonate resin (of an amount of 10 to 40% by weight, preferably 20 to 30% by weight based on the amount of the organic solvent), an adduct of (a) a polyhydric alcohol and/or an aromatic alcohol and (b) an alkylene oxide and, as necessary, a polyalkylene ether glycol having oxyalkylene units (the adduct and the polyalkylene ether glycol are used in an amount of 5 to 50% by weight, preferably 5 to 20% by weight based on the amount of the polycarbonate resin, separately or as a mixture), whereby a solution is prepared.

Next, water is added to the solution in small portions, with stirring at a speed of preferably 3,000 rpm or more by the use of a stirrer (for example, a homogenizer of strong shear force is preferred), whereby conversion from a water-in-oil (W/O) type emulsion to an oil-in-water (O/W) type emulsion is allowed to take place and an opaque white emulsion is obtained. This emulsion is subjected to ordinary distillation to remove the organic solvent, whereby an aqueous polycarbonate resin emulsion is produced.

The modified emulsion of polycarbonate resin according to the present invention comprises a polycarbonate resin emulsion obtained as above and a monocarbodiimide compound and/or a polycarbodiimide compound.

As to the monocarbodiimide compound used in the present invention, there is no particular restriction, and the monocarbodiimide compound can be exemplified by dicyclohexyl-carbodiimide, diisopropylcarbodiimide, dimethylcarbodiimide, diisobutylcarbodiimide, dioctylcarbodiimide, tert-butylisopropyl carbodiimide, diphenylcarbodiimide, di-tert-butylcarbodiimide and di-β-naphthylcarbodiimide. Of these, particularly preferred are dicyclohexylcarbodiimide and diisopropylcarbodiimide in view of the commercial availability.

As the polycarbodiimide compound, there can be used those produced by various processes. There can be used, with no particular restriction, any polycarbodiimide compounds produced by conventional processes described in U.S. Pat. No. 2,941,956; JP-B-47-33279; J. Org. Chem. 28, 2069–2075 (1963); Chemical Review 1981, Vol. 81, No. 4, 619–621; etc.

Specifically, an isocyanate-terminated polycarbodiimide can be produced by a condensation reaction of an organic diisocyanate where dioxide is removed.

As the organic diisocyanate used as a raw material in the above polycarbodiimide production, there can be mentioned, for example, aromatic diisocyanates, aliphatic diisocyanates, alicyclic diisocyanates and mixtures thereof. Specific examples of these diisocyanates are 1,5-naphthylene di-isocyanate, diphenylmethane-4,4'-diisocyanate, 3,3'-dimethyldi-phenylmethane-4,4'-diisocyanate, 1,3-phenylene diisocyanate, 1,4-phenylene diisocyanate, 2,4-tolylene diisocyanate, 2,6-tolylene diisocyanate, a mixture of 2,4-tolylene diisocyanate and 2,6-tolylene diisocyanate, hexamethylene diisocyanate, cyclohexane-1,4-diisocyanate, xylylene diisocyanate, isophorone di-isocyanate, dicyclohexylmethane-4,4'-diisocyanate, methylcyclohexane diisocyanate and tetramethylxylylene diisocyanate.

In production of a polycarbodiimide from the organic diisocyanate, there can be used a compound (e.g. monoisocyanate) reactive with the terminal isocyanate of polycarbodiimide, in order to obtain a polycarbodiimide having an appropriately controlled molecular weight. As the monoisocyanate for controlling the polymerization degree of polycarbodiimide by blocking the terminal of polycarbodiimide, there can be used, for example, phenyl isocyanate, tolyl isocyanate, dimethylphenyl isocyanate, cyclohexyl isocyanate, butyl isocyanate and naphthyl isocyanate.

As the terminal-blocking agent, there can also be used, besides the above monoisocyanates, compounds having —OH, —NH$_2$, —COOH, —SH or —NH alkyl terminal.

The condensation reaction of organic isocyanate where removal of carbon dioxide takes place, proceeds in the presence of a carbodiimidization catalyst. As the carbodiimidization catalyst, there can be used phosphorene oxides such as 1-phenyl-2-phosphorene-1-oxide, 3-methyl-2-phosphorene-1-oxide, 1-ethyl-2-phosphorene-1-oxide, 3-methyl-1-phenyl-2-phosphorene-1-oxide, 3-phosphorene derivatives thereof, and the like. Of these, preferred is 3-methyl-1-phenyl-2-phosphorene-1-oxide.

The monocarbodiimide compound or the polycarbodiimide compound, when mixed with the polycarbonate resin emulsion, is desired to keep uniformity. To achieve it, it is preferred that, prior to mixing with the polycarbonate resin emulsion, the monocarbodiimide compound or the polycarbodiimide compound is emulsified using an appropriate emulsifier, or the polycarbodiimide compound is allowed to contain, in the molecule, a hydrophilic segment and is made into a self-emulsiable or self-soluble polycarbodiimide compound.

As the emulsifier used to make the monocarbodiimide compound or the polycarbodiimide compound into an aqueous emulsion, a nonionic surfactant is preferred and a specific example thereof is a nonylphenol surfactant.

The self-emulsifiable or self-soluble polycarbodiimide compound can be produced by producing an isocyanate-terminated polycarbodiimide according to a condensation reaction of organic diisocyanate (where removal of carbon dioxide takes place) and then adding, to the polycarbodiimide compound, a hydrophilic segment having a functional group reactive with isocyanate group.

The hydrophilic segment can be exemplified by quaternary ammonium salts of dialkylaminoalcohol represented by the following formula (1):

(wherein $R^1$ is a lower alkyl group having 1 to 5 carbon atoms, and $R^2$ is an alkylene, polyalkylene or oxyalkylene group having 1 to 10 carbon atoms), and a quaternary ammonium salt of 2-dimethylaminoethanol is particularly preferred. When the quaternary ammonium salt of compound (1) is used, the resulting self-emulsifiable or self-soluble polycarbodiimide compound is a cationic type.

The hydrophilic segment can be exemplified also by quaternary ammonium salts of dialkylaminoalkylamine represented by the following formula (2):

$$(R^1)_2-N-R^2-NH_2 \quad (2)$$

(wherein $R^1$ and $R^2$ have the same definitions as given above), and a quaternary ammonium salt of 3-dimethylamino-n-propylamine is particularly preferred. When the quaternary ammonium salt of compound (2) is used, the resulting self-emulsfiable or self-soluble polycarbodiimide compound is a cationic type.

The hydrophilic segment can be exemplified also by alkylsulfonic acid salts having at least one reactive hydroxyl group, represented by the following formula (3):

$$HO-R^3-SO_3M \quad (3)$$

(wherein $R^3$ is an alkylene group having 1 to 10 carbon atoms, and M is an alkali metal), and sodium hydroxypropanesulfonate is particularly preferred. When the compound (3) is used, the resulting self-emulsifiable or self-soluble polycarbodiimide compound is an anionic type.

The hydrophilic segment can be exemplified also by alkoxy group-terminated poly(ethylene oxide)s or mixtures of alkoxy group-terminated poly(ethylene)oxide and alkoxy group-terminated poly(propylene oxide), all represented by the following formula (4):

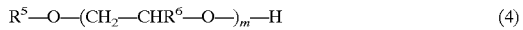

$$R^5-O-(CH_2-CHR^6-O-)_m-H \quad (4)$$

(wherein $R^5$ is an alkyl group having 1 to 4 carbon atoms; $R^6$ is a hydrogen atom or a methyl group; and m is an integer of 4 to 30), and a methoxy group- or ethoxy group-terminated poly (ethylene oxide) is particularly preferred. When the compound (4) is used, the resulting self-emulsifiable or self-soluble polycarbodiimide compound is a nonionic type.

In the present invention, the amount of the monocarbodiimide compound or the polycarbodiimide compound added to the polycarbonate resin emulsion is preferably 0.01 to 0.2, preferably 0.02, to 0.1 in terms of the weight ratio of the carbodiimide compound to the solid content of the polycarbonate resin emulsion.

When the weight ratio of the carbodiimide compound to the solid content of the polycarbonate resin emulsion is less than 0.01, properties such as adhesivity, water resistance and chemical resistance may not be exhibited. When the weight ratio is more than 0.2, coloring may appear and transparency, etc. may be affected adversely.

In the present invention, the monocarbodiimide compound or the polycarbodiimide compound can be used in a plurality of kinds and can be easily mixed with the polycarbonate resin emulsion by the use of a general-purpose mixer. When the resulting mixture is adjusted for viscosity, concentration, etc. in view of its use as a coating or the like, the adjustment can be made using water as a diluent.

The modified emulsion of polycarbonate resin according to the present invention comprises, as described above, a polycarbonate resin emulsion and a monocarbodiimide compound and/or a polycarbodiimide compound; is improved in adhesivity, water resistance and chemical resistance; and, moreover, is very advantageous in environmental sanitation because it is water-based.

EXAMPLES

The present invention is described specifically below by way of Synthesis Examples, Examples and Comparative Examples. However, the present invention is in no way restricted to these Examples. In the following, parts are all by weight.

Synthesis Example 1

Aqueous dispersion 1 of carbodiimide (forced dispersion of aliphatic carbodiimide)

There were reacted, at 180° C. for 24 hours, 549 g of m-tetramethylxylylene diisocyanate, 49.5 g of n-butyl isocyanate and 5.99 g of 3-methyl-1-phenyl-2-phosphorene-1-oxide (carbodiimidization catalyst) to obtain a carbodiimide compound (average polymerization degree=10). To 200 g of this carbodiimide resin was gradually added 200 g of distilled water in which 1 g of a nonylphenol type nonionic surfactant [Phenerol (trade name) produced by Matsumoto Yushi-Seiyaku K.K.] had been dissolved, whereby an aqueous dispersion 1 (resin concentration=50% by weight) of carbodiimide compound was obtained.

Synthesis Example 2

Aqueous dispersion 2 of carbodiimide (forced dispersion of aliphatic carbodiimide)

There were reacted, at 180° C. for 24 hours, 590 g of 4,4'-dicyclohexylmethane diisocyanate, 62.6 g of cyclohexyl isocyanate and 6.12 g of 3-methyl-1-phenyl-2-phosphorene-1-oxide (carbodiimidization catalyst) to obtain a carbodiimide compound (average polymerization degree=10). This carbodiimide resin was sufficiently ground. To 200 g of the resulting powder was gradually added 200 g of distilled water in which 1 g of a nonylphenol type nonionic surfactant [Phenerol (trade name) produced by Matsumoto Yushi-Seiyaku K.K.] had been dissolved, whereby an aqueous dispersion 2 (resin concentration=50% by weight) of carbodiimide compound was obtained.

Synthesis Example 3

Aqueous dispersion 3 of carbodiimide (forced dispersion of aliphatic carbodiimide)

There were reacted, at 180° C. for 24 hours, 500 g of isophorone diisocyanate, 62.6 g of cyclohexyl isocyanate and 5.63 g of 3-methyl-1-phenyl-2-phosphorene-1-oxide (carbodiimidization catalyst) to obtain a carbodiimide compound (average polymerization degree=10). This carbodiimide resin was sufficiently ground. To 200 g of the resulting powder was gradually added 200 g of distilled water in which 1 g of a nonylphenol type nonionic surfactant [Phenerol (trade name) produced by Matsumoto Yushi-Seiyaku K.K.] had been dissolved, whereby an aqueous dispersion 3 (resin concentration=50% by weight) of carbodiimide compound was obtained.

Synthesis Example 4

Aqueous dispersion 4 of carbodiimide (forced dispersion of aromatic carbodiimide)

There were reacted, at 120° C. for 4 hours, 563 g of diphenylmethane-4,4'-diisocyanate, 59.5 g of phenyl isocyanate and 1.50 g of 3-methyl-1-phenyl-2-phosphorene-1-oxide (carbodiimidization catalyst) in 2,458 g of Perclene to obtain a solution of a carbodiimide compound (average polymerization degree=10). This solution was cooled and made into a slurry. The slurry was spray-dried to obtain a carbodiimide powder. 200 g of the carbodiimide powder was gradually added to 200 g of distilled water in which 1 g of a nonylphenol type nonionic surfactant [Phenerol (trade name) produced by Matsumoto Yushi-Seiyaku K.K.] had been dissolved, whereby an aqueous dispersion 4 (resin concentration=50% by weight) of carbodiimide compound was obtained.

Synthesis Example 5

Aqueous dispersion 5 of carbodiimide (forced dispersion of aromatic carbodiimide)

There were reacted, at 80° C. for 1 hour, 348 g of a 20:80 mixture of 2,6-tolylene diisocyanate and 2,4-tolylene diisocyanate, 119 g of phenyl isocyanate and 0.93 g of 3-methyl-1-phenyl-2-phosphorene-1-oxide (carbodiimidization catalyst) to obtain a carbodiimide compound (average polymerization degree=5). This carbodiimide resin was sufficiently ground to obtain a carbodiimide powder. To 200 g of the powder was gradually added 200 g of distilled water in which 1 g of a nonylphenol type nonionic surfactant [Phenerol (trade name) produced by Matsumoto Yushi-Seiyaku K.K.] had been dissolved, whereby an aqueous dispersion 5 (resin concentration=50% by weight) of carbodiimide compound was obtained.

Synthesis Example 6

Aqueous emulsion 6 of hydrophilic carbodiimide (self-emulsion of aliphatic anionic carbodiimide)

There were reacted, at 180° C. for 32 hours, 700 g of m-tetramethylxylylene diisocyanate and 14 g of 3-methyl-1-phenyl-2-phosphorene-1-oxide (carbodiimidization catalyst) to obtain an isocyanate-terminated carbodiimide compound (average polymerization degree=10). 224.4 g of the carbodiimide compound was reacted with 32.4 g of sodium hydroxypropanesulfonate at 100° C. for 24 hours. Thereto was gradually added 256.8 g of distilled water at 80° C. to obtain an aqueous emulsion 6 (resin concentration= 50% by weight) of hydrophilic carbodiimide compound.

Synthesis Example 7

Aqueous emulsion 7 of hydrophilic carbodiimide (self-emulsion of aliphatic anionic carbodiimide)

There were reacted, at 180° C. for 15 hours, 700 g of m-tetramethylxylylene diisocyanate and 14 g of 3-methyl-1-phenyl-2-phosphorene-1-oxide (carbodiimidization catalyst) to obtain an isocyanate-terminated carbodiimide compound (average polymerization degree=5). 124.4 g of the carbodiimide compound was reacted with 32.4 g of sodium hydroxypropanesulfonate at 100° C. for 24 hours. Thereto was gradually added 156.8 g of distilled water at 80° C. to obtain an aqueous emulsion 7 (resin concentration= 50% by weight) of if hydrophilic carbodiimide compound.

Synthesis Example 8

Aqueous emulsion 8 of hydrophilic carbodiimide (self-emulsion of aliphatic anionic carbodiimide)

There were reacted, at 180° C. for 32 hours, 700 g of 4,4'-dicyclohexylmethane diisocyanate and 14 g of 3-methyl-1-phenyl-2-phosphorene-1-oxide (carbodiimidization catalyst) to obtain an isocyanate-terminated carbodiimide compound (average polymerization degree=10). 244.2 g of the carbodiimide compound was reacted with 32.4 g of sodium hydroxypropanesulfonate at 100° C. for 24 hours. Thereto was gradually added 276.6 g of distilled water at 80° C. to obtain an aqueous emulsion 8 (resin concentration=50% by weight) of hydrophilic carbodiimide compound.

Synthesis Example 9

Aqueous emulsion 9 of hydrophilic carbodiimide (self-emulsion of aliphatic anionic carbodiimide)

There were reacted, at 180° C. for 16 hours, 700 g of 4,4'-dicyclohexylmethane diisocyanate and 14 g of 3-methyl-1-phenyl-2-phosphorene-1-oxide (carbodiimidization catalyst) to obtain an isocyanate-terminated carbodiimide compound (average polymerization degree=4). 91.6 g of the carbodiimide compound was reacted with 32.4 g of sodium hydroxypropanesulfonate at 100° C. for 24 hours. Thereto was gradually added 124 g of distilled water at 80° C. to obtain an aqueous emulsion 9 (resin concentration=50% by weight) of hydrophilic carbodiimide compound.

Synthesis Example 10

Aqueous emulsion 10 of hydrophilic carbodiimide (self-emulsion of aliphatic anionic carbodiimide)

There were reacted, at 180° C. for 14 hours, 700 g of isophorone diisocyanate and 14 g of 3-methyl-9-phenyl-2-phospho-rene-1-oxide (carbodiimidization catalyst) to obtain an isocyanate-terminated carbodiimide compound (average polymerization degree=10). 200.2 g of the carbodiimide compound was reacted with 32.4 g of sodium hydroxypropanesulfonate at 100° C. for 24 hours. Thereto was gradually added 232.6 g of distilled water at 80° C. to obtain an aqueous emulsion 10 (resin concentration=50% by weight) of hydrophilic carbodiimide compound.

Synthesis Example 11

Aqueous emulsion 11 of hydrophilic carbodiimide (self-emulsion of aliphatic anionic carbodiimide)

There were reacted, at 180° C. for 10 hours, 700 g of isophorone diisocyanate and 14 g of 3-methyl-1-phenyl-2-phospho-rene-1-oxide (carbodiimidization catalyst) to obtain an isocyanate-terminated carbodiimide compound (average polymerization degree=5). 110.0 g of the carbodiimide compound was reacted with 32.4 g of sodium hydroxypropanesulfonate at 100° C. for 24 hours. Thereto was gradually added 142.4 g of distilled water at 80° C. to obtain an aqueous emulsion 11 (resin concentration=50% by weight) of hydrophilic carbodiimide compound.

Synthesis Example 12

Aqueous emulsion 12 of hydrophilic carbodiimide (self-emulsion of aliphatic cationic carbodiimide)

There were reacted, at 180° C. for 18 hours, 700 g of m-tetramethylxylylene diisocyanate and 14 g of 3-methyl-1-phenyl-2-phosphorene-1-oxide (carbodiimidization catalyst) to obtain an isocyanate-terminated carbodiimide compound (average polymerization degree=10). 112.2 g of the carbodiimide compound was reacted with 8.9 g of 2-dimethylaminoethanol at 80° C. for 24 hours. Thereto was added 18.6 g of methyl p-toluene sulfonate, after which stirring was conducted for 1 hour to give rise to quaternization. Thereto was gradually added 139.7 g of distilled water to obtain an aqueous emulsion 12 (resin concentration=50% by weight) of hydrophilic carbodiimide compound.

Synthesis Example 13

Aqueous solution 13 of hydrophilic carbodiimide (self-solution of aliphatic cationic carbodiimide)

There were reacted, at 180° C. for 18 hours, 700 g of m-tetramethylxylylene diisocyanate and 14 g of 3-methyl-1-phenyl-2-phosphorene-1-oxide (carbodiimidization catalyst) to obtain an isocyanate-terminated carbodiimide compound (average polymerization degree=4). 52.2 g of the carbodiimide compound was reacted with 8.9 g of 2-dimethylaminoethanol at 80° C. for 24 hours. Thereto was added 18.6 g of methyl p-toluenesulfonate, after which stirring was conducted for 1 hour to give rise to quaternization. Thereto was gradually added 79.7 g of distilled water to obtain a yellow transparent aqueous solution 13 (resin concentration=50% by weight) of hydrophilic carbodiimide compound.

Synthesis Example 14

Aqueous emulsion 14 of hydrophilic carbodiimide (self-emulsion of aliphatic cationic carbodiimide)

There were reacted, at 180° C. for 18 hours, 700 g of 4,4'-dicyclohexylmethane diisocyanate and 14 g of 3-methyl-1-phenyl-2-phosphorene-1-oxide (carbodiimidization catalyst) to obtain an isocyanate-terminated carbodiimide compound (average polymerization degree=10). 122.1 g of the carbodiimide compound was reacted with 8.9 g of 2-dimethylaminoethanol at 80° C. for 24 hours. Thereto was added 18.6 g of methyl p-toluene sulfonate, after which stirring was conducted for 1 hour to give rise to quaternization. Thereto was gradually added 149.6 g of distilled water to obtain an aqueous emulsion 14 (resin concentration 50% by weight) of hydrophilic carbodiimide compound.

Synthesis Example 15

Aqueous solution 15 of hydrophilic carbodiimide (self-solution of aliphatic cationic carbodiimide)

There were reacted, at 180° C. for 24 hours, 700 g of 4,4'-dicyclohexylmethane diisocyanate and 14 g of 3-methyl-1-phenyl-2-phosphorene-1-oxide (carbodiimidization catalyst) to obtain an isocyanate-terminated carbodiimide compound (average polymerization degree=4). 56.7 g of the carbodiimide compound was reacted with 8.9 g of 2-dimethylaminoethanol at 80° C. for 24 hours. Thereto was added 18.6 g of methyl p-toluenesulfonate, after which stirring was conducted for 1 hour to give rise to quaternization. Thereto was gradually added 84.2 g of distilled water to obtain a yellow transparent aqueous solution 15 (resin concentration=50% by weight) of hydrophilic carbodiimide compound.

Synthesis Example 16

Aqueous emulsion 16 of hydrophilic carbodiimide (self-emulsion of aliphatic cationic carbodiimide)

There were reacted, at 180° C. for 18 hours, 700 g of isophorone diisocyanate and 14 g of 3-methyl-1-phenyl-2-phosphor- ene-1-oxide (carbodiimidization catalyst) to obtain an isocyanate-terminated carbodiimide compound (average polymerization degree=10). 100.1 g of the carbodiimide compound was reacted with 8.9 g of 2-dimethylaminoethanol at 80° C. for 24 hours. Thereto was added 18.6 g of methyl p-toluene sulfonate, after which stirring was conducted for 1 hour to give rise to quaternization. Thereto was gradually added 127.6 g of distilled water to obtain an aqueous emulsion 16 (resin concentration=50% by weight) of hydrophilic carbodiimide compound.

Synthesis Example 17

Aqueous solution 17 of hydrophilic carbodiimide (self-solution of aliphatic cationic carbodiimide)

There were reacted, at 180° C. for 6 hours, 700 g of isophorone diisocyanate and 14 g of 3-methyl-1-phenyl-2-phosphor- ene-1-oxide (carbodiimidization catalyst) to obtain an isocyanate-terminated carbodiimide compound (average polymerization degree=4). 93.4 g of the carbodiimide compound was reacted with 17.8 g of 2-dimethylaminoethanol at 80° C. for 24 hours. Thereto was added 37.2 g of methyl p-toluenesulfonate, after which stirring was conducted for 1 hour to give rise to quaternization. Thereto was gradually added 148.4 g of distilled water to obtain a yellow transparent aqueous solution 17 (resin concentration=50% by weight) of hydrophilic carbodiimide compound.

Synthesis Example 18

Aqueous emulsion 18 of hydrophilic carbodiimide (self-emulsion of aliphatic nonionic carbodiimide)

There were reacted, at 180° C. for 32 hours, 700 g of m-tetramethylxylylene diisocyanate and 14 g of 3-methyl-1-phenyl-2-phosphorene-1-oxide (carbodiimidization catalyst) to obtain an isocyanate-terminated carbodiimide compound (average polymerization degree=10). 224.4 g of the carbodiimide compound was reacted with 59.2 g of a poly(oxyethylene) monomethyl ether (polymerization degree m=6) at 100° C. for 48 hours. Thereto was gradually added 283.6 g of distilled water at 50° C. to obtain an aqueous emulsion 18 (resin concentration=50% by weight) of hydrophilic carbodiimide compound.

Synthesis Example 19

Aqueous solution 19 of hydrophilic carbodiimide (self-solution of aliphatic nonionic carbodiimide)

There were reacted, at 180° C. for 22 hours, 700 g of m-tetramethylxylylene diisocyanate and 14 g of 3-methyl-1-phenyl-2-phosphorene-1-oxide (carbodiimidization catalyst) to obtain an isocyanate-terminated carbodiimide compound (average polymerization degree=5). 124.4 g of the carbodiimide compound was reacted with 59.2 g of a poly(oxyethylene) monomethyl ether (polymerization degree m=6) at 100° C. for 48 hours. Thereto was gradually added 183.6 g of distilled water at 50° C. to obtain a yellow transparent aqueous solution 19 (resin concentration=50% by weight) of hydrophilic carbodiimide compound.

Synthesis Example 20

Aqueous emulsion 20 of hydrophilic carbodiimide (self-emulsion of aliphatic nonionic carbodiimide)

There were reacted, at 180° C. for 32 hours, 700 g of 4,4'-dicyclohexylmethane diisocyanate and 14 g of 3-methyl-1-phenyl-2-phosphorene-1-oxide (carbodiimidization catalyst) to obtain an isocyanate-terminated carbodiimide compound (average polymerization degree=10). 244.2 g of the carbodiimide compound was reacted with 59.2 g of a poly(oxyethylene) monomethyl ether (polymerization degree m=6) at 100° C. for 48 hours. Thereto was gradually added 303.4 g of distilled water at 50° C. to obtain an aqueous emulsion 20 (resin concentration=50% by weight) of hydrophilic carbodiimide compound.

Synthesis Example 21

Aqueous solution 21 of hydrophilic carbodiimide (self-solution of aliphatic nonionic carbodiimide)

There were reacted, at 180° C. for 10 hours, 700 g of 4,4'-dicyclohexylmethane diisocyanate and 14 g of 3-methyl-1-phenyl-2-phosphorene-1-oxide (carbodiimidization catalyst) to obtain an isocyanate-terminated carbodiimide compound (average polymerization degree=4). 113.4 g of the carbodiimide compound was reacted with 59.2 g of a poly(oxyethylene) monomethyl ether (polymerization degree m=6) at 100° C. for 48 hours. Thereto was gradually added 172.6 g of distilled water at 50° C. to obtain a yellow transparent aqueous solution 21 (resin concentration=50% by weight) of hydrophilic carbodiimide compound.

Synthesis Example 22
Aqueous emulsion 22 of hydrophilic carbodiimide (self-emulsion of aliphatic nonionic carbodiimide)

There were reacted, at 180° C. for 14 hours, 700 g of isophorone diisocyanate and 14 g of 3-methyl-1-phenyl-2-phosphor- ene-1-oxide (carbodiimidization catalyst) to obtain an isocyanate-terminated carbodiimide compound (average polymerization degree=10). 200.2 g of the carbodiimide compound was reacted with 59.2 g of a poly (oxyethylene) monomethyl ether (polymerization degree m=6) at 100° C. for 48 hours. Thereto was gradually added 259.4 g of distilled water at 50° C. to obtain an aqueous emulsion 22 (resin concentration=50% by weight) of hydrophilic carbodiimide compound.

Synthesis Example 23
Aqueous solution 23 of hydrophilic carbodiimide (self-solution of aliphatic nonionic carbodiimide)

There were reacted, at 180° C. for 8 hours, 700 g of isophorone diisocyanate and 14 g of 3-methyl-1-phenyl-2-phosphor- ene-1-oxide (carbodiimidization catalyst) to obtain an isocyanate-terminated carbodiimide compound (average polymerization degree=5). 111.2 g of the carbodiimide compound was reacted with 59.2 g of a poly (oxyethylene) monomethyl ether (polymerization degree m=6) at 100° C. for 24 hours. Thereto was gradually added 152.6 g of distilled water at 50° C. to obtain a yellow transparent aqueous solution 23 (resin concentration=50% by weight) of hydrophilic carbodiimide compound.

Synthesis Example 24
Production of polycarbonate resin emulsion

In a mixture of 80 parts of methylene chloride and 20 parts of dioxane were dissolved 20 parts of a polycarbonate resin [Panlite AD-5503 (trade name) produced by Teijin Chemicals Limited, molecular weight=15,000] and 5 parts of an adduct obtained by adding 150 moles of a polyoxyethylene to castor oil. While the resulting solution was stirred by a homogenizer, 75 parts of water was added thereto in small portions, whereby conversion from a water-in-oil (W/O) type emulsion to an oil-in-water (O/W) type emulsion was allowed to take place and an opaque white emulsion was obtained. The emulsion was subjected to vacuum distillation to remove the solvent (methylene chloride and dioxane), whereby a polycarbonate resin emulsion having a resin concentration (solid content) of 25% by weight was produced.

Synthesis Example 25
Production of polycarbonate resin emulsion

In a mixture of 80 parts of dioxolan and 20 parts of cyclohexene were dissolved 20 parts of a polycarbonate resin [Panlite L-1250 (trade name) produced by Teijin Chemicals Limited, molecular weight=25,000], 2 parts of an adduct obtained by adding 150 moles of a polyoxyethylene to castor oil and 3 parts of a block type polyalkylene ether glycol (molecular weight=12,000) wherein the proportion of oxyethylene (EO) and oxypropylene (PO) was 80:20. While the resulting solution was stirred by a homogenizer, 75 parts of water was added thereto in small portions, whereby conversion from a water-in-oil (W/O) type emulsion to an oil-in-water (O/W) type emulsion was allowed to take place and an opaque white emulsion was obtained. The emulsion was subjected to vacuum distillation to remove the solvent (dioxolan and cyclohexane), whereby a polycarbonate resin emulsion having a resin concentration (solid content) of 25% by weight was produced.

Example 1
100 parts by weight of the polycarbonate resin emulsion obtained in Synthesis Example 24 was mixed with 3 parts by weight of the carbodiimide dispersion 1 obtained in Synthesis Example 1. The resulting mixture was coated on a polyethylene terephthalate (PET) film having a thickness of 100 μm, so as to give an as-dried coating film thickness of 25 μm. The resulting film was dried at 120° C. for 20 minutes.

Examples 2 to 23
The same operation as in Example 1 was conducted except that the carbodiimide dispersion 1 was changed to one of the carbodiimide dispersions, self-emulsions and self-solutions obtained in Synthesis Examples 2 to 23.

Comparative Example 1
The same operation as in Example 1 was conducted except that the carbodiimide dispersion 1 was not added.

Example 24
100 parts by weight of the polycarbonate resin emulsion obtained in Synthesis Example 25 was mixed with 3 parts by weight of the carbodiimide dispersion 1 obtained in Synthesis Example 1. The resulting mixture was coated on a polyethylene terephthalate (PET) film having a thickness of 100 μm, so as to give an as-dried coating film thickness of 25 μm. The resulting film was dried at 120° C. for 20 minutes.

Examples 25 to 46
The same operation as in Example 24 was conducted except that the carbodiimide dispersion 1 was changed to one of the carbodiimide dispersions, self-emulsions and self-solutions obtained in Synthesis Examples 2 to 23.

Comparative Example 2
The same operation as in Example 24 was conducted except that the carbodiimide dispersion 1 was not added.

Each coating film obtained above was tested for adhesivity and water resistance as follows. The results are shown in Table 1 and Table 2.

TABLE 1

| Example | Polycarbonate resin emulsion | Carboiimide dispersion, emulsion or solution | Carboiimide/ polycarbonate | Adhesivity | Water resistance |
|---|---|---|---|---|---|
| 1 | Polycarbonate | 1 (Synthesis Exampe 1) | 0.06 | 4 | 161 |
| 2 | resin emulsion | 2 (Synthesis Exampe 2) | 0.06 | 8 | 356 |
| 3 | of Synthesis | 3 (Synthesis Exampe 3) | 0.06 | 6 | 248 |
| 4 | Example 24 | 4 (Synthesis Exampe 4) | 0.06 | 10 | 500 or more |
| 5 | | 5 (Synthesis Exampe 5) | 0.06 | 10 | 500 or more |
| 6 | | 6 (Synthesis Exampe 6) | 0.06 | 6 | 199 |

TABLE 1-continued

| Example | Polycarbonate resin emulsion | Carboiimide dispersion, emulsion or solution | Carboiimide/ polycarbonate | Adhesivity | Water resistance |
|---|---|---|---|---|---|
| 7 |  | 7 (Synthesis Exampe 7) | 0.06 | 6 | 185 |
| 8 |  | 8 (Synthesis Exampe 8) | 0.06 | 10 | 500 or more |
| 9 |  | 9 (Synthesis Exampe 9) | 0.06 | 10 | 421 |
| 10 |  | 10 (Synthesis Exampe 10) | 0.06 | 8 | 231 |
| 11 |  | 11 (Synthesis Exampe 11) | 0.06 | 6 | 201 |
| 12 |  | 12 (Synthesis Exampe 12) | 0.06 | 8 | 195 |
| 13 |  | 13 (Synthesis Exampe 13) | 0.06 | 6 | 176 |
| 14 |  | 14 (Synthesis Exampe 14) | 0.06 | 10 | 489 |
| 15 |  | 15 (Synthesis Exampe 15) | 0.06 | 10 | 432 |
| 16 |  | 16 (Synthesis Exampe 16) | 0.06 | 8 | 225 |
| 17 |  | 17 (Synthesis Exampe 17) | 0.06 | 6 | 192 |
| 18 |  | 18 (Synthesis Exampe 18) | 0.06 | 6 | 170 |
| 19 |  | 19 (Synthesis Exampe 19) | 0.06 | 6 | 166 |
| 20 |  | 20 (Synthesis Exampe 20) | 0.06 | 10 | 300 |
| 21 |  | 21 (Synthesis Exampe 21) | 0.06 | 8 | 500 or more |
| 22 |  | 22 (Synthesis Exampe 22) | 0.06 | 8 | 308 |
| 23 |  | 23 (Synthesis Exampe 23) | 0.06 | 6 | 285 |
| Comporative Example 1 |  | — | — | 0 | 144 |

TABLE 2

| Example | Polycarbonate resin emulsion | Carboiimide dispersion, emulsion or solution | Carboiimide/ polycarbonate | Adhesivity | Water resistance |
|---|---|---|---|---|---|
| 24 | Polycarbonate resin emulsion of Synthesis Example 25 | 1 (Synthesis Exampe 1) | 0.06 | 6 | 139 |
| 25 |  | 2 (Synthesis Exampe 2) | 0.06 | 8 | 320 |
| 26 |  | 3 (Synthesis Exampe 3) | 0.06 | 8 | 198 |
| 27 |  | 4 (Synthesis Exampe 4) | 0.06 | 10 | 469 |
| 28 |  | 5 (Synthesis 5) | 0.06 | 10 | 500 or more |
| 29 |  | 6 (Synthesis Exampe 6) | 0.06 | 6 | 177 |
| 30 |  | 7 (Synthesis Exampe 7) | 0.06 | 4 | 163 |
| 31 |  | 8 (Synthesis Exampe 8) | 0.06 | 10 | 500 or more |
| 32 |  | 9 (Synthesis Exampe 9) | 0.06 | 10 | 401 |
| 33 |  | 10 (Synthesis Exampe 10) | 0.06 | 6 | 219 |
| 34 |  | 11 (Synthesis Exampe 11) | 0.06 | 4 | 188 |
| 35 |  | 12 (Synthesis Exampe 12) | 0.06 | 6 | 201 |
| 36 |  | 13 (Synthesis Exampe 13) | 0.06 | 6 | 165 |
| 37 |  | 14 (Synthesis Exampe 14) | 0.06 | 10 | 433 |
| 38 |  | 15 (Synthesis Exampe 15) | 0.06 | 8 | 420 |
| 39 |  | 16 (Synthesis Exampe 16) | 0.06 | 6 | 211 |
| 40 |  | 17 (Synthesis Exampe 17) | 0.06 | 4 | 190 |
| 41 |  | 18 (Synthesis Exampe 18) | 0.06 | 6 | 153 |
| 42 |  | 19 (Synthesis Exampe 19) | 0.06 | 4 | 164 |
| 43 |  | 20 (Synthesis Exampe 20) | 0.06 | 10 | 311 |
| 44 |  | 21 (Synthesis Exampe 21) | 0.06 | 10 | 500 or more |
| 45 |  | 22 (Synthesis Exampe 22) | 0.06 | 8 | 285 |
| 46 |  | 23 (Synthesis Exampe 23) | 0.06 | 6 | 244 |
| Compoartive Example 2 |  | — | — | 0 | 118 |

Adhesivity

A PET film having a coating film thereon was allowed to stand at 20° C. for 1 hour. Then, 100 squares per cm$^2$ were formed, by cutting, in the coating film according to the cross-cut test specified by JIS K 5400. A cellophane tape was placed on the coating film and a sufficient pressure was applied. The cellophane tape was quickly peeled off and the number of the squares remaining on the PET film was examined to evaluate the adhesivity of the coating film. The adhesivity was indicated by point according to the following standard.

| Point | Conditions of cut line and peeling |
|---|---|
| 10 | Each cut line is fine and smooth, and no peeling is seen in each cut line intersection or each square area. |
| 8 | Slight peeling is seen in cut line intersections but there is no peeling in each square, and the area of peeled portion is 5% or less of the total square area. |
| 6 | Peeling is seen in cut lines and their intersections, and the area of peeled portion is 5 to 15% of the total square area. |
| 4 | The width of peeling resulting from cut line is large, and the area of peeled portion is 15 to 35% of the total square area. |

| Point | Conditions of cut line and peeling |
|---|---|
| 2 | The width of peeling resulting from cut line is larger than in the above point 4, and the area of peeled portion is 35 to 65% of the total square area. |
| 0 | The area of peeled portion is 65% or more of the total square area. |

Water resistance

A gauze was impregnated with a water/methanol mixed solvent (water/methanol=4/6 in weight) and pressed against the coating film side of a PET film having a coating film thereon. In this state, rubbing was conducted to measure the times of rubbing required until the peeling of the coating film occurred. The times were taken as the water resistance of the coating film.

As is clear from the above description, the modified emulsion of polycarbonate resin according to the present invention is superior in adhesivity and other properties. The modified emulsion can be easily produced by the present process for production of such a modified emulsion of polycarbonate resin.

What is claimed is:

1. A modified emulsion of polycarbonate resin, comprising a polycarbonate resin emulsion and a monocarbodiimide compound and/or a polycarbodiimide compound.

2. A modified emulsion of polycarbonate resin according to claim 1, wherein the polycarbonate resin emulsion is an emulsion containing a polycarbonate resin, an adduct of (a) a polyhydric alcohol and/or an aromatic alcohol and (b) an alkylene oxide and, as necessary, a polyalkylene ether glycol having oxyalkylene units.

3. A modified emulsion of polycarbonate resin according to claim 1, wherein the polycarbonate resin emulsion is obtained by dissolving, in an organic solvent, a mixture of a polycarbonate resin, and adduct of (a) d polyhydric alcohol and/or an aromatic alcohol and (b) an alkylene oxide and, as necessary, a polyalkylene ether glycol having oxyalkylene units, then mixing the resulting solution with water for emulsification, and subjecting the resulting emulsion to solvent removal.

4. A modified emulsion of polycarbonate resin according to claim 1, wherein the proportion of the monocarbodiimide compound and/or the polycarbodiimide compound is 0.01 to 0.2 in terms of the weight ratio of the carbodiimide compound(s) to the solid content of the polycarbonate resin emulsion.

5. A process for producing a modified emulsion of polycarbonate resin, which comprises adding a monocarbodiimide compound and/or a polycarbodiimide compound to a polycarbonate resin emulsion.

* * * * *